United States Patent

Moran

[15] 3,672,477
[45] June 27, 1972

[54] CLUTCH

[72] Inventor: John J. Moran, Houston, Tex.
[73] Assignee: Hycel, Inc., Houston, Tex.
[22] Filed: June 21, 1971
[21] Appl. No.: 154,988

Related U.S. Application Data

[62] Division of Ser. No. 737,065, June 14, 1968, Pat. No. 3,622,279.

[52] U.S. Cl.....................................192/27, 192/38, 192/44
[51] Int. Cl.................F16d 41/02, F16d 41/07, F16d 41/08
[58] Field of Search..................................192/27, 38, 44, 45

[56] References Cited

UNITED STATES PATENTS

| 2,140,737 | 12/1938 | Dickens | 192/27 |
| 2,634,121 | 4/1953 | Peters et al. | 192/27 X |
| 2,644,560 | 7/1953 | Kleinschmidt | 192/44 X |

Primary Examiner—Allan D. Herrmann
Attorney—James F. Weiler et al.

[57] ABSTRACT

In a spring loaded cam type clutch having a driving and driven member, the improvement for providing two-way drive by providing a reversing pin connected to one of the members and a spring loaded pawl pivotally mounted on the second member for bypassing the reversing pin in the forward direction, but engaging the reversing pin and driving the driven member in the reverse direction.

1 Claim, 4 Drawing Figures

PATENTED JUN 27 1972 3,672,477
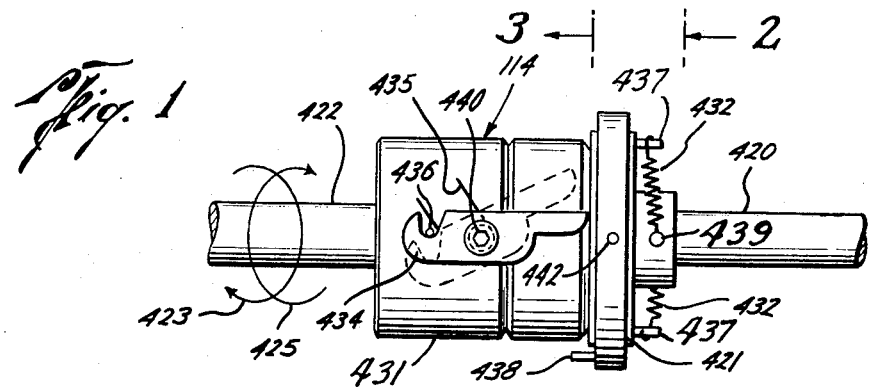
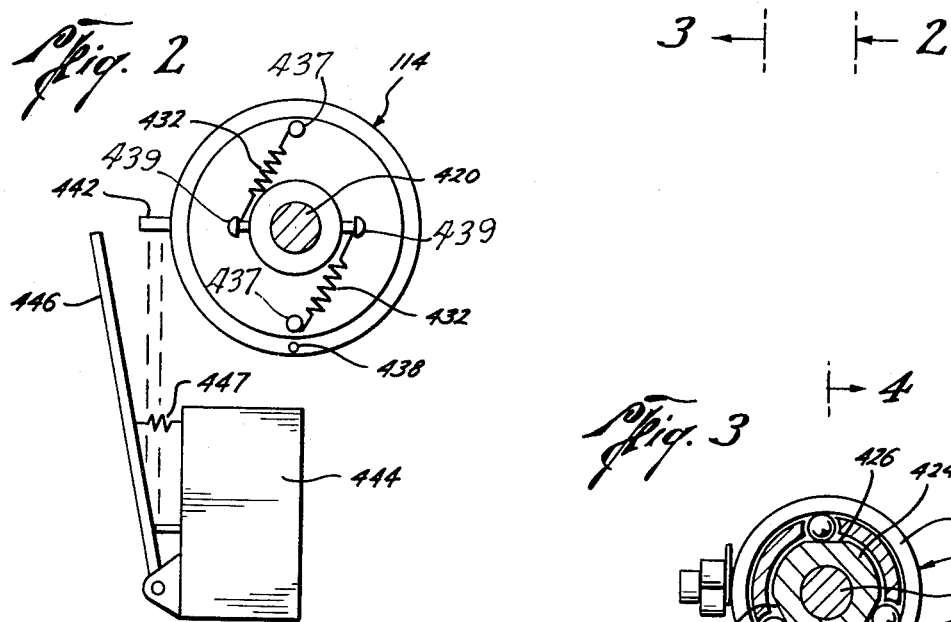
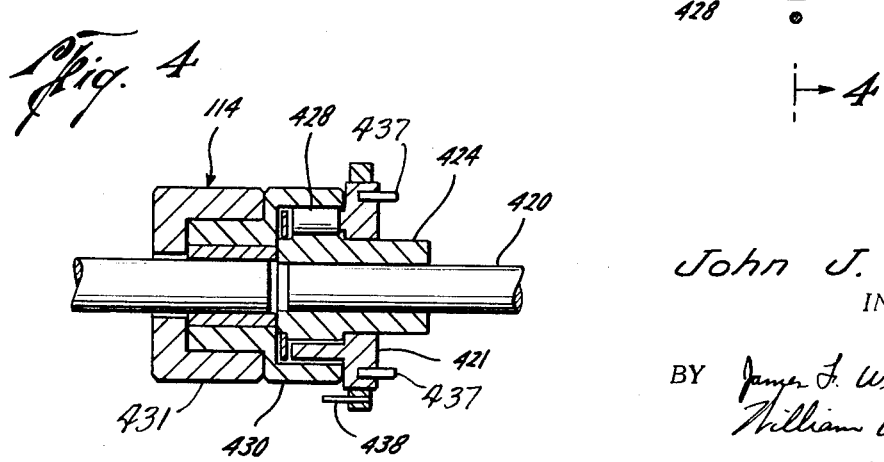
John J. Moran
INVENTOR.
BY James L. Weiler
William G. Stout
ATTORNEYS

CLUTCH

CROSS-REFERENCES TO RELATED APPLICATIONS

This application is a divisional application of co-pending Pat. application Ser. No. 737,065 filed June 14, 1968, now U.S. Pat. No. 3,622,279, entitled Automatic Chemical Testing Apparatus.

BACKGROUND OF THE INVENTION

In a conventional spring loaded cam clutch the clutch will provide a drive or a disconnect in a single rotational direction. The present invention is directed to an improvement to such a clutch which will provide drive in a reverse rotational direction.

SUMMARY

The present invention is directed to an improvement in a spring actuated cam clutch of a spring loaded pawl pivotally mounted on one of the driving and driven members and a reversing pin connected to the other of said members whereby the pawl will ratchet by the pin in one direction, but engages the pin in a second direction to provide a reverse drive whereby the clutch may be actuated for a driving movement in either rotational direction.

BRIEF DESCRIPTION OF THE DRAWINGS

FIG. 1 is a fragmentary elevational view, partly in cross section, illustrating the two-way clutch assembly of the present invention, FIG. 2 is a view taken along the line 2—2 of FIG. 1, FIG. 3 is a view taken along the line 3—3 of FIG. 1, and FIG. 4 is a view taken along the line 4—4 of FIG. 3.

DESCRIPTION OF THE PREFERRED EMBODIMENT

Referring now to the drawings, the reference numeral 114 generally refers to the clutch of the present invention which is positioned between a driving shaft and a driven shaft, wherein shaft 422 is the driving shaft and shaft 420 is the driven shaft.

As is conventional in a spring loaded cam clutch the driven shaft 420 in clutch roller case member 421 is connected by the action of a cam member 424 having cam surfaces 426 thereon which are adapted to engage clutch rollers 428 and cause them to engage a driving member housing 430 which in turn is connected to the driving shaft 422. Member 430 includes member 431 fixedly secured thereto and which rotates with member 430. Springs 432 are connected between the driven roller case member 421 and the cam member 424 for causing the cam member 424 to engage the clutch rollers 428 and cause them to engage the driving housing member 430. Thus, one end of springs 432 is connected to pins 437 on member 421 and the second end of springs 432 is connected to pins 439 on member 434. However, this conventional clutch operation will operate to drive in a single rotational direction of the drive shaft 422 and provide a disconnect in the reverse direction. The direction of drive is determined by the direction the springs 432 are connected between the driven housing 421 and the cam member 424.

A forward indexing pin 442 and external stop means such as a solenoid 444 having an actuating lever 446 (FIG. 2) is provided. When solenoid 446 is deenergized, the actuating lever 446 is yieldably urged by spring 447 into engagement with the forwarding indexing pin 442 and stops the driven shaft 420 and expands the springs 432 thereby releasing the internal bearings 428. Thus, the drive shaft 422 continuously turns, but is disconnected from the driven shaft 420. However, when solenoid 444 is energized, the actuating lever 446 moves out of engagement with pin 442, and the driving shaft 422 will drive the driven shaft 420 conventionally through clutch 114 but only in a single direction.

The present improvement is directed to improving the conventional clutch to provide a two-way drive between the driving shaft 422 and the driven shaft 420. A reversing pawl 434 is provided pivotally mounted by pin 440 on member 431 and is yieldably urged against a stop pin 436 by a spring 435. One end of spring 435 is positioned against pin 436 and the other end of spring 435 is connected to pawl 435. A reverse pin 438 is mounted on roller case member 421 and protrudes so as to engage the end of the pawl 434. When the driving shaft 422 is being driven conventionally, and the rollers 428 are engaging the driving housing member 430 the clutch will be conventionally engaged and there will be no interaction between the pawl 434 and the reversing pin 438. That is, when the driving shaft 422 is turned in a counterclockwise direction 423, the driven shaft 420 turns conventionally as the springs 432 contract and engage the internal rollers 428 in the clutch. However, when the solenoid 444 is deenergized to move the actuating lever 446 into position engaging forward indexing pin 442 disengaging the rollers 428 from the housing 430 and releases the driven shaft 420 from the driving shaft 422. While the drive shaft 422 continues to turn, the spring loaded pawl 434 ratchets past the reversing pin 438. Thus, the driven shaft 420 remains disconnected and will only turn when the forward indexing pin 422 is released by the actuating lever 446 on energization of solenoid 444.

However, when the drive shaft 422 is driven in a clockwise direction 425, the pawl 434 engages reverse pin 438 thereby causing the driven shaft 420 to begin to turn clockwise. Thus, the improved clutch 114 of the present invention may be simply actuated in either direction of rotation of the drive shaft 420.

The present invention, therefore, is well adapted to carry out the objects and attain the ends and advantages mentioned as well as others inherent therein. While a presently preferred embodiment of the invention is given for the purpose of disclosure, numerous changes in the details of construction and arrangement of parts will readily suggest themselves to those skilled in the art and are encompassed within the spirit of the invention and the scope of the appended claims.

What is claimed is:

1. In combination with a clutch having a driving member, a driven member having a cam and roller case member, rollers carried by the driven member between the cam and roller case member, a spring between the cam and roller case member urging said rollers into engagement with the driving member in one rotational direction thereby providing engagement of said clutch as said driving member is driven in said one direction, but providing disengagement of the rollers as the driving member is driven in the other rotational direction and overcomes said spring, an indexing pin connected to the driven member roller case member, stop means positioned to engage said indexing pin for releasing said rollers and disconnecting said clutch in said second direction, of a two-way drive comprising, a spring loaded pawl pivotally mounted on said driving member and with one end extending adjacent the driven member, a stop pin holding said one end against movement in said second direction, but allowing movement of said one end in the first direction, and a reversing pin connected to the driven member, and positioned to engage said pawl one end.

* * * * *